United States Patent
Davis (10) Patent No.: US 11,226,638 B2
(45) Date of Patent: Jan. 18, 2022

(54) HAULING VEHICLE ADMINISTRATION WITH NAVIGATION

(71) Applicant: TRUCKIT, LLC, Atlanta, GA (US)

(72) Inventor: Pace Davis, Atlanta, GA (US)

(73) Assignee: TRUCKIT, LLC, Atlanta, GA (US)

( * ) Notice: Subject to any disclaimer, the term of this patent is extended or adjusted under 35 U.S.C. 154(b) by 320 days.

(21) Appl. No.: 16/217,011

(22) Filed: Dec. 11, 2018

(65) Prior Publication Data
US 2020/0183422 A1 Jun. 11, 2020

(51) Int. Cl.
G01C 21/00 (2006.01)
G05D 1/02 (2020.01)
G01C 21/36 (2006.01)

(52) U.S. Cl.
CPC ....... *G05D 1/0297* (2013.01); *G01C 21/3676* (2013.01); *G01C 21/3697* (2013.01); *G05D 2201/0202* (2013.01)

(58) Field of Classification Search
CPC .................................................. G01C 21/3676
See application file for complete search history.

(56) References Cited

U.S. PATENT DOCUMENTS

| | | |
|---|---|---|
| 2003/0171939 A1 | 9/2003 | Yagesh et al. |
| 2005/0080520 A1* | 4/2005 | Kline .................. F03G 7/04 701/1 |
| 2007/0241882 A1 | 10/2007 | Panttaja et al. |
| 2012/0041675 A1 | 2/2012 | Juliver et al. |
| 2012/0253548 A1 | 10/2012 | Davidson |
| 2013/0026819 A1 | 1/2013 | Reshad et al. |

OTHER PUBLICATIONS

Office Action dated Apr. 6, 2020 for related U.S. Appl. No. 16/215,599.
International Search Report and Written Opinion dated Mar. 30, 2020 for related PCT/US2019/065543.

* cited by examiner

*Primary Examiner* — Truc M Do
(74) *Attorney, Agent, or Firm* — H. Artoush Ohanian (57) ABSTRACT

Methods, systems, processes and others for hauling vehicle administration including a pick-up administration module, a digital ticket server, and a drop-off administration module. The pick-up administration module including one or more beacons and a scale house operations application, wherein the scale house operations application is also adapted for data communications with a mobile driver application associated with the hauling vehicle. In example embodiments, the scale-house operations application is configured to create a digital hauling confirmation ticket including a plurality of the hauling attributes and transmit the digital hauling confirmation ticket to a digital ticket server and the driver mobile application through the digital ticket server. In example embodiments, the drop-off administration module is configured to confirm in dependence upon the digital ticket that the material delivered by the hauling vehicle arrived at the drop-off site.

18 Claims, 8 Drawing Sheets

HAULING VEHICLE ADMINISTRATION WITH NAVIGATION

BACKGROUND

Hauling vehicles come in many forms and transport many types of materials that function in our day-to-day life. More particularly, hauling vehicles are essential in the transportation of materials required for both residential and commercial construction world-wide. Despite the essential nature of these hauling vehicles and their close ties to highly sophisticated companies and industries, tracking the pick-up and drop-off of the material transported by these vehicles is relatively archaic. The confirmation of the pick-up and the drop-off of materials transported by a hauling vehicle from a pick-up site to a drop-off site is typically administered by a paper-based physical ticketing system that is inaccurate, laborious, and inefficient.

BRIEF DESCRIPTION OF THE DRAWINGS

Many aspects of the present disclosure can be better understood with reference to the accompanying drawings. The components in the drawings are not necessarily to scale, with emphasis instead being placed upon clearly illustrating the principles of the disclosure. Moreover, in the drawings, like reference numerals designate corresponding parts throughout the several views. Other technical advantages may become readily apparent to one of ordinary skill in the art after review of the following figures and description.

DETAILED DESCRIPTION

Figure 1:
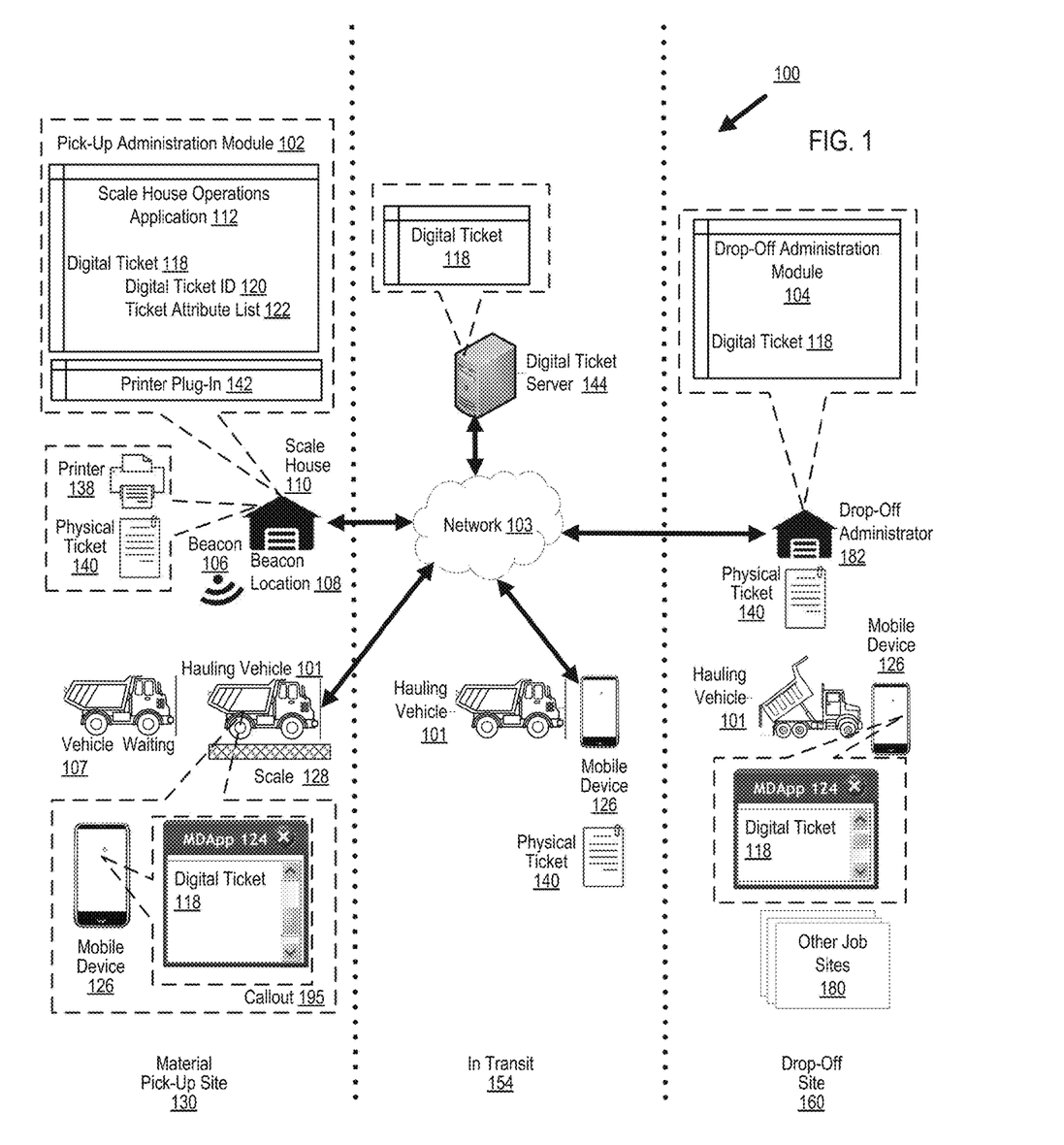
FIG. 1 sets forth a system diagram illustrating an example networked system for hauling vehicle administration according to embodiments of the present invention.

Example embodiments of the present invention are described with reference to the accompanying drawings, beginning with FIG. 1. FIG. 1 sets forth a system diagram illustrating a networked system (100) for hauling vehicle (101) administration according to embodiments of the present invention.

The example system of FIG. 1 operates generally to facilitate hauling vehicle administration from a material pick-up site (130) to a drop-off site (160) through the administration of a digital hauling confirmation ticket (118) administered in large part by a digital ticket server (118). Digital hauling confirmation tickets (118) and the infrastructures supporting such digital hauling confirmation tickets according to embodiments of the present invention improve the efficiency and accuracy of the administration of the transportation of material from a pick-up site (130) to a drop-off site (160). Such digital hauling confirmation tickets and their supporting infrastructures are useful for various hauling vehicles and various materials so transported. Digital hauling confirmation tickets (118) and their infrastructure provide an efficient and effective way of identifying what material is picked up at a pick-up site, at what time the pick-up is occurring, who is picking up the material, where the material is going, how it is getting there, what time the material is expected to be dropped off, and many other attributes of material transportation as will occur to those of skill in the art.

The system of FIG. 1 operates generally to confirm, through data communications, between a mobile digital application (124) at the pick-up site (130) with the digital ticket server (118), that a particular hauling vehicle (101) is on a particular scale (128) operated by that material pick-up site (130) such that a single identifiable hauling vehicle weight can be attributed to a particular digital hauling confirmation ticket for that measured hauling vehicle. Alternative embodiments allow for multiple scales and multiple hauling vehicles to be weighted more or more scale houses or material pick-up sites.

The system of FIG. 1 includes a pick-up administration module (102) that receives one or more attributes (122) associated with the material and the hauling vehicle (101) for inclusion in a digital hauling confirmation ticket. In the example of FIG. 1, one or more of the attributes of the digital hauling confirmation ticket are collected by a scale house operations application (112) from the scale upon which the hauling vehicle (101) is weighed. The scale house operations application (112) of FIG. 1 creates a digital hauling confirmation ticket (118) including one or more attributes (122) associated with the transportation of the material and transmits that digital hauling confirmation ticket (118) through a printer plug-in (142) and a network (103) to a digital ticket server (144).

The digital ticket server (144) of FIG. 1 sends through the network (103) the digital hauling confirmation ticket (118) to the mobile digital application administered by a driver of the hauling vehicle (101).

Hauling vehicles (101) according to embodiments of the present invention are vehicles, often used in commercial endeavors such as material transportation for both commercial and residential construction sites, capable of transporting material from a pick-up material site to a drop-off site according to embodiments of the present invention. Examples of hauling vehicles useful in embodiments of the present invention include dump trucks, pickup trucks, large semi-trailer trucks, personal vehicles capable of carrying substantial material, trailers, and other vehicles as will occur to those of skill in the art. The example hauling vehicles are for explanation and not for limitations. Many other types of hauling vehicles may be useful for hauling vehicle administration according to embodiments of the present invention and all such vehicles are well within the scope of the present invention.

As mentioned above, the system of FIG. 1 operates generally to facilitate hauling vehicle administration from a material pick-up site (130) to a drop-off site (160). A material pick up site (130) as that term is used in this specification is a location operated to dispense material transported by the hauling vehicle (101). Examples of material pick-up sites according to embodiments of the present invention include quarries, material sales sites, lumber yards, timber pick-up locations, construction sites, and others as will occur to those of skill in the art. Examples of material typically picked up at material pick-up sites according to embodiments of the present invention include gravel, asphalt, lime, stone, sand, bush, wood, timber, construction waste, supplies, and many others as will occur to those of skill in the art.

The system of FIG. 1 also includes a drop-off site (160). The drop-off site (160) of FIG. 1 is a location for receiving the material transported by the hauling vehicle (101). Examples of drop-off sites (160) according to embodiments of the present invention include construction sites, landfills, infrastructure rebuilding and repair sites, project sites, short-term sites such as disaster recovery sites, music festivals and many others as will occur to those of skill in the art.

In the example embodiment drop-off sites often provide infrastructure for assisting in dropping off material and facilitating hauling vehicle administration. Such infrastructure typically includes data communications with a mobile digital application (124) or other application associated with the hauling vehicle (101) to confirm the hauling vehicle (101) transporting the material has arrived and performed the function of dropping off material. The mobile digital application (124) at the drop-off site is coupled for data communications with a digital ticket server (144) through network (103) data communications that administers the receipt, confirmation, validation, or other administrative functions associated with the digital hauling confirmation ticket representing the transportation of the material by the hauling vehicle.

As will occur to those of skill in the art, the example system of FIG. 1 is bi-directional. That is, in some situations, a site may be a material pick-up site and in other situations that same site may be a drop-off site. For example, a construction site may receive a drop-off of material and then be a material pick-up site for material to be transported to a landfill. This bi-directionality includes the entire system as designated in FIG. 1.

As mentioned above, the example system of FIG. 1 operates generally for hauling administration from a pick-up site (130) to a drop off site (160). The system of FIG. 1 includes a pick-up administration module (102), a digital ticket server (144), a mobile driver application (124) and a drop-off administration module (104) all coupled for data communications through a network (103). The data communications in the example of FIG. 1 may operate in a typical first in first out ('FIFO') query from one object to the next. Intermittency is expected in situations of wireless connected networks. In such occasions that intermittency occurs the data is held at the corresponding module until such connection is restored. When such connection is restored the FIFO method of organizing and manipulating data is continued. Additional networking and data communication transfer methods in querying theory are disclosed and may be employed to achieve similar results to FIFO. The example of FIFO data manipulation is for explanation and not for limitation. As will occur to those of skill in the art, data may be transferred or manipulated in accordance with the present invention in many ways including last in first out ("LIFO") and so on.

The system of FIG. 1 operates generally for hauling vehicle (101) administration by confirming, by the digital ticket server (144), in dependence upon data communications received from the mobile driver application (124) that the hauling vehicle associated with the mobile driver application (124) is the only vehicle on the scale administered by the scale house. The mobile driver application (124) of FIG. 1 communicates with one or more beacons (106) located at one or more particular locations (108) relative to a scale (128) and presents the beacon values to the mobile driver application that in turn transmits those values to the digital ticket server (144).

The digital ticket server (144) of FIG. 1 receives the beacon values and calculates, based on a number of parameters, that one hauling vehicle—the hauling vehicle associated with the mobile driver application (124)—is currently on a scale administered by the scale house of the material pick-up site. In some embodiments of the present invention, the digital ticket server (144) calculates that the hauling vehicle associated with the mobile driver application (124) by triangulating or trilaterating the position of the hauling vehicle in dependence upon the location of the one or more beacons (106) as discussed in more detail below with reference to FIG. 2. Triangulation and trilateration are some of many forms of calculating that only one hauling vehicle is currently on the scale as will occur to those of skill in the art. The combination of trilateration and triangulation known as triangulateration is still another such method for further defining the location of the position of the hauling vehicle (101). Many other methods of position measurement are within the scope of the present invention.

The system of FIG. 1 operates generally by receiving, by the scale house operations application (112) from a scale house operator through a user interface ('UI') (134) configured to receive hauling attributes (122) an identification of the hauling vehicle (101). In many embodiments the hauling vehicle identification is simply displayed on the hauling vehicle itself and the scale house operator can simply provide the hauling vehicle identification through the UI (134). In alternative embodiments, the hauling vehicle or mobile driver application may be configured to provide the identification of the hauling vehicle to the scale house operations application (112) without user intervention through, for example, a mobile driver application, a wireless connection with the hauling vehicle itself or any other method of providing a hauling vehicle identification that will occur to those of skill in the art.

The scale house operation application (112) also receives hauling vehicle attributes from the scale through data communications between the scale house operations application and the scale itself or as direct input from the scale house operator. Hauling attributes according to embodiments of the present invention are indicia describing the hauling of the material from the material pick-up site to the drop-off site. Examples of hauling attributes include weight, digital hauling confirmation ticket ID, driver ID, mobile driver application ID, job ID, current weight of the vehicle; material ID, drop-off site ID, drop-off site location, pick-up site ID, pick-up site location, date of pick-up, time of pickup and many others as will occur to those of skill in the art.

The system of FIG. 1 also operates generally by receiving, through the UI from the scale house operator, one or more hauling vehicle attributes (122). One example of a hauling vehicle attribute (122) is simply the identification of the hauling vehicle itself often displayed on that particular hauling vehicle. In the example of FIG. 1, the scale house operator may be empowered to provide additional hauling attributes that are not provided directly from the scale through the UI to the scale house operations application (112) as will occur to those of skill in the art.

A scale house operator is often an employee of the scale house who performs duties around the scale house such as administering the weighing of hauling vehicles, reviewing material dispensed at the scale house, and many other administrative functions of the scale house as will occur to those of skill in the art.

The system of FIG. 1 also operates generally by creating, by the scale house operations application (112) through a printer plug-in and in dependence upon the hauling attributes (122), a digital hauling confirmation ticket (118). The digital hauling confirmation ticket (118) includes a plurality of hauling attributes (122) associated with the hauling vehicle (101). The digital hauling confirmation ticket (118) is created by the scale house operations application (112) and transmitted to a digital ticket server (144). The digital ticket server (144) operates as a network server storing the digital ticket (118) for each of the operational hauling vehicles.

The digital hauling confirmation ticket (118) according to the example of FIG. 1 is implemented as an instance of a digital ticket—that is structured data with both form and in some embodiments function. Such a digital hauling confirmation ticket (118) may be implemented as structured data but may also include, in some embodiments, associated member methods to access one or more attributes in that structured data as will occur to those of skill in the art.

The digital hauling confirmation ticket (118) has a defined data structure efficiently representing hauling attributes and their respective values associated with the hauling of the material from the pick-up site to the drop-off site. In some embodiments of the present invention, the digital hauling confirmation ticket (118) is implemented using a markup language such as the extensible markup language ("XML"). XML allows for encoding of documents in a format that is both human-readable and machine-readable. The XML format is default for many productivity tools including Microsoft Office™, Open Office™, and LibreOffice™. By utilizing the XML standard the communications and information stored in the digital ticket (118) and subsequently the data of the ticket attribute list (122) may be cross referenced with additional computing applications utilized in scale house administration. The digital hauling confirmation ticket (118) of FIG. 1 may also implement or be implemented by additional programming and markup languages including HyperText Markup Language ("HTML"), the Standard Generalized Markup Language ("SGML"), and Extensible HyperText Markup Language ("XHTML").

In the example of FIG. 1, the digital hauling confirmation ticket (118) is created in its digitized and structured form through a printer plug-in (142) associated with a printer (138) adapted to print the physical confirmation ticket (140) commonly used in the industry. The the digital hauling confirmation ticket (118) so created includes one or more of the same attributes (122) of such a physical confirmation ticket printed by the printer (138) associated with the printer plug-in (142). While the digital hauling confirmation ticket usefully provides hauling confirmation useful in embodiments of the present invention, a physical confirmation ticket printed by the printer provides a useful paper trail describing the hauling attributes associated with the transport of the material from material pick-up site to the drop-off site by the hauling vehicle. Paper confirmation tickets are often generated in multiple copies to enable administration of a paper ticket trail at the material pick-up site (130), with the hauling vehicle operator in transit (154), and upon receipt of the material at the drop-off site (160).

The system of FIG. 1 also operates generally by transmitting, by the scale house operations application (112) through the plug-in to the digital ticket server (144), the digital hauling confirmation ticket (214). In the example of FIG. 1 the digital hauling confirmation ticket is transmitted through the network (103). The network of FIG. 1 is often implemented through cellular standards such as 1G™ 2G™, 3G™, 4G LTE™ and 5G™. Additional communication protocols such as wireless LAN, wireless WAN, and SAN are also capable of transmission of data such as the digital ticket (118) through the network (103). Transmitting the digital ticket (118) to the digital ticket server (144) and to the mobile device (126) often occurs over several data communication protocols such as a cellular data transmission, WI-FI™ transmission, transmission using Bluetooth™, and others as will occur to those of skill in the art in networking administration.

The system of FIG. 1 also operates by transmitting, through the network, the digital hauling confirmation ticket from the digital ticket server (144) to the mobile driver application (124) associated with the hauling vehicle (101).

The system of FIG. 1 also operates generally by confirming, by the digital ticket server (144), that the material was delivered to the drop-off site. As discussed below with reference to FIG. 4, confirming that the hauling vehicle (101) arrived at the drop-off site may be carried out in a number of ways as will occur to those of skill in the art.

Figure 2:
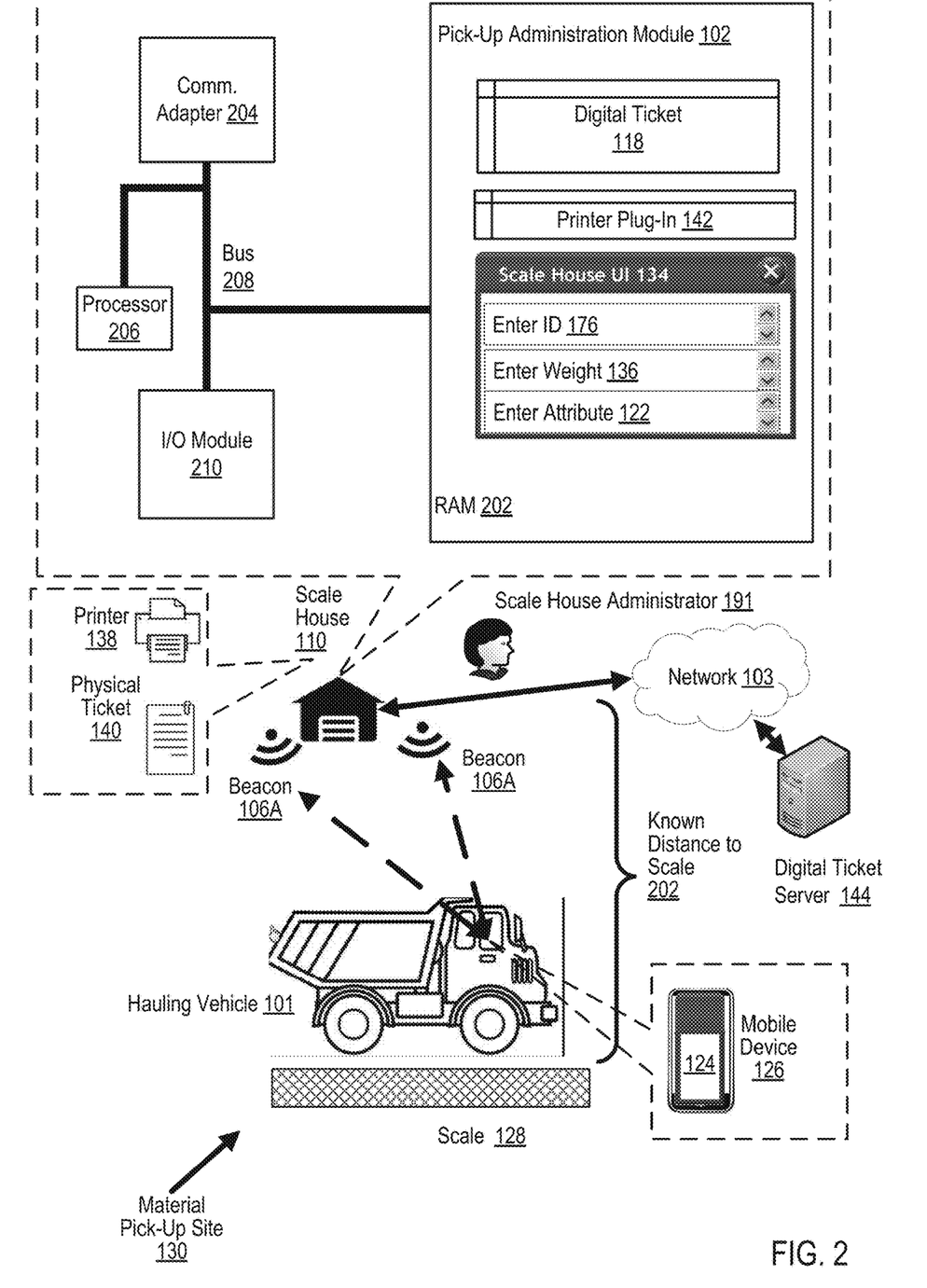
FIG. 2 sets forth a system diagram illustrating a networked system for hauling vehicle administration at a pick-up site according to embodiments of the present invention.

For further explanation, FIG. 2 sets forth a system diagram illustrating a networked system (100) for hauling vehicle (101) administration at a pick-up site according to embodiments of the present invention. As mentioned above, the system of FIG. 1 includes a pick-up administration module (102) installed at a material pick-up site (130). The pick-up administration module (102) of FIG. 2 is a module of automated computing machinery adapted to facilitate the administration of hauling vehicles at the pick-up site (130), including the administration of the receipt of attributes related to the material picked up by a hauling vehicle, and the creation of a digital hauling confirmation ticket (128) that includes those attributes and provides a useful vehicle for the confirmation of the transportation of that material.

Automated computing machinery, as that phrase is used in this specification, means a module, segment, or portion of code or other automated computing logic, hardware, software, firmware, and other logic, as well as the combination of any of the aforementioned, as will occur to those of skill in the art—both local and remote. Automated computing machinery is often implemented as executable instructions, physical units, or other computing logic for implementing the specified logical function(s) as will occur to those of skill in the art. As mentioned, such automated computing machinery implement logical units both local and remote and as such, often implement data communications across buses, networks, wired and wireless as will occur to those of skill in the art and all such data communications are well within the scope of the present invention.

In the example of FIG. 2, the pick-up administration module (102) is stored and executes in an automated computing environment that includes random access memory (202) with access through a system bus (208) to a processor (206), a communications adapter (204), and an Input/Output ("I/O") Module (210). The pick-up administration module (102) of FIG. 2 also includes a scale house operations application (112). The scale house operations application (112) of FIG. 2 is a module of automated computing machinery facilitating the administration of a hauling vehicle (101) for a scale house at the material pick-up site according to embodiments of the present invention.

In the example of FIG. 2, the scale house (110) has installed one or more beacons (106) installed at a known distance from the scale (128). The example beacons (106) of FIG. 2 are implemented as Bluetooth™ beacons used to confirm that a single hauling vehicle is on the scale (128). Bluetooth™ beacons, in the example of FIG. 2, are typically small, low power, beacons commonly utilized to provide push notifications, information delivery, and presence detection. An example of Bluetooth™ beacons useful in the example embodiment of FIG. 2 are Estimote™ beacons, described in detail at https://estimote.com, incorporated by reference. Estimote's™ beacons have a range of up to 200 meters and built in sensors to detect motion, temperature, ambient light, magnetometer, and pressure. Estimote™ beacons detect location through auto mapping or manual mapping utilizing the Estimote™ SDK to prepare devices for integration with the beacon technology. Estimote's™ beacons further include technologies for mesh networking and programmable near field communications ("NFC").

In some example embodiments, beacons according to embodiments of the present invention may transmit, for example, a UUID, major or minor values of the beacon's namespace, and an identification as well as other information as will occur to those of skill in the art. In the example embodiment of FIG. 1, the Bluetooth™ beacons (108) transmit a beacon value for the hauling vehicle (101) on the scale (128) to the mobile device application (124). In the example embodiment the Bluetooth™ beacons are configured to communicate with mobile driver application (124) on the a mobile device (126) on the scale of the scale house. In some embodiments, the beacons values are turned into real-world coordinates by assigning signal values through Received Signal Strength Indicator ("RSSI"). RSSI represents a value of a received radio signal, the longer the distance the device is from the beacon the lower the RSSI. RSSI is defined by the IEEE 802.11 system and forms arbitrary units based on the indication of power level being received by the antennae. The higher the RSSI value the stronger the signal and thus the closer the proximity the antennae or receiving device is to the radio transmitter. In some embodiments, there is no standardized relationship between any particular parameter and the RSSI reading. Furthermore, RSSI often does not have a relationship between the power level transmitted and the signal strength received.

Received channel power indicator ("RCPI") is another technology to measure the received radio frequency power in a selected channel over the preamble and the entire received frame of signal. The RCPI is a power level metric like RSSI and cannot measure the quality of the link of communication, rather it can measure the strength of the indicator.

Because typical Bluetooth™ beacons do not possesses directional antennas they can only receive an estimation of the distance a device is to the beacon. Bluetooth™ beacons lack directional input as to the direction the device is located relative to the beacon. Trilateration provides a means for acquiring device directional and distance information relative to Bluetooth™ beacons. Trilateration requires a minimum of three beacons positioned to compare the relative RSSI value between them. Additional elements such as Kalman filters, linear quadratic estimation, may be applied to Bluetooth™ beacon technology to overcome unwanted noise or false positives with trilateration.

In some embodiments of the present invention, a single Bluetooth™ beacon can be utilized to determine whether the vehicle has entered the zone for measurement. The RSSI or RCPI is set to a threshold to determine whether the vehicle is within proximity to the zone of measurement. The zone of measurement is usually located where the scale (128) is located but there may also be a plurality of zones of measurements and scales (128). Additionally, any combination of Bluetooth™ beacons may be utilized to further increase the reliability of location sensing. With at least three Bluetooth™ beacons the precision is increased through trilateration, triangulation and other location algorithms as will occur to those of skill in the art. Trilateration is the process of determining absolute or relative locations of points by measurement of distances from at least three beacons. Trilateration works by using geometry of circles, spheres, or other triangles.

Triangulation is the process of determining location of a point by measuring only angles to it from known points at either end of a fixed baseline. Triangulation differs from trilateration as it measures angles rather than the distance to the point. GPS and Bluetooth™ beacons commonly use trilateration to determine a device relative to the beacon. Additional embodiments may be utilized in the current embodiment including the use of indoor positioning systems ("IPS") such as magnetic positioning, LiFi access points, or dead reckoning will be apparent to those of skill in the art. In some embodiments the example of FIG. 2, a form of location algorithm may be used with only two beacons (106A and 106B) because the distance (202) from the scale house and the two beacons to the scale itself is known and fixed.

Beacons (106) according to embodiments of the present invention may also be used to confirm that only one hauling vehicle is on a scale (128) by geo-fencing. A geo-fence is a virtual perimeter for a real-world geographic area. Geo-fences are typically dynamically generated, as a radius around a point or around a pre-defined location. In the present embodiment a geo-fence may be established to locate a hauling vehicle (101) within a pre-defined parameter. The scale house operations application (112) may then be triggered by the presence of the hauling vehicle (101) to automate the parameters such as beacon ID (114), beacon value (116), and digital ticket attributes (122). Geo-fencing could also be utilized in notification-based systems in the present embodiment as well as location-based logging and tracking of hauling vehicles (101). The pick-up administration module (102) may include peripherals to set up, operate, and process geo-fencing information and logs. Further, the drop-off administration module (104) may be set up and equipped with a similar geo-fencing module in order to detect and log hauling vehicles (101) and the job site (160). Likewise, the geo-fencing in the present embodiment may work by communicating with the hauling vehicle's mobile device (126) and through the mobile device application (124).

The examples of triangulation, trilateration, and geo-fencing are provided for explanation and not for limitation. In fact, other technologies may be used to identify that only one hauling vehicle is currently on the scale according to embodiments of the present invention including WiFi™ location sensing, RFID location technologies, and others as will occur to those of skill in the art.

The example of FIG. 2, the mobile driver application (124) is adapted for data communications through a mobile device (126) with the beacons installed at the scale house. The mobile driver application (124) receives from each beacon a beacon ID and beacon value and provides the beacon IDs and beacon values to the digital ticket server (144) and often also provides identification of the hauling vehicle (101) utilizing the mobile driver application (124) and an identification of the scale house (110).

Upon receiving the beacon (106) IDs and values the digital ticket server (144) determines that only the hauling vehicle associated with the digital hauling confirmation ticket (118) received from the scale house application (112) is on the scale. That is, the digital ticket server determines that the weight represented in the digital hauling confirmation ticket is not altered by having additional vehicles partially on the scale at the same time as the hauling vehicle associated with the digital hauling confirmation ticket. The digital ticket server of FIG. 2, determines that only one hauling vehicle (101) is on the scale in dependence upon the beacon IDs, the beacon values, and a known distance (202) between the scale and the beacons (106A and 106B).

In the example of FIG. 2, the scale house operations application (112) includes a user interface ('UI') (134) for presentation to a scale house operator and designed to receive, from the scale house operator, attributes of the hauling vehicle to be included in one or more digital hauling confirmation tickets according to embodiments of the present invention. The attributes in the digital hauling confirmation ticket (118) often include attributes associated with the transportation of the material from the material pick-up site (130) to the drop-off site, and in some embodiments, various attributes describing the hauling vehicle's in-transit operations from the pick-up site to the drop-off site as will occur to those of skill in the art.

In the example of FIG. 2, the user interface (134) includes UI widgets (176, 136, 122) provided by the scale house operations application to receive the ID (176) of the hauling vehicle (101). Such an identification is often displayed on the hauling vehicle itself. The scale house operations application of FIG. 2 is also includes a UI widget to receive the weight (136) of the hauling vehicle (101) on the scale (128) and provided to an operator through data communications with the scale (128) and other attributes (122) as will occur to those of skill in the art. Examples of other hauling attributes useful according to embodiments of the present invention include weight, digital hauling confirmation ticket ID, driver ID, mobile driver application ID, job ID, current weight of the vehicle; material ID, drop-off site ID, drop-off site location, pick-up site ID, pick-up site location, date of pick-up, time of pickup and many others as will occur to those of skill in the art.

In the example of FIG. 2, a scale provides to the operator of the scale house (191) for inclusion in the digital confirmation ticket the weight of at least the vehicle with the material loaded. The scale of FIG. 2 is a weighting system capable of identifying at least the weight of the hauling vehicle set up on it. Examples of scales (128) useful according to embodiments of the present invention include the Trimble Loadrite 360™, the Rinstrum Axle™, WEIGHR In-Motion Truck Scale™, and others as will occur to those of skill in the art. Such example scales may be modified as will occur to those of skill in the art to provide additional or different hauling attributes according to embodiments of the present invention.

In alternative embodiments of the present invention, hauling vehicles (101) are equipped with onboard scales. In such embodiments, the onboard scale is used instead of the large standard scale and is coupled for data communication with the scale house application or with the mobile driver application and capable of transmitting to an operator the weight of the material loaded in the hauling vehicle. Examples of such scales include Walz OnBoard™, and other onboard scales as will occur to those of skill in the art.

The UI (134) of FIG. 2 is provided for ease of explanation and not for limitation. In fact, in other embodiments many other fields may be represented by the UI (134) of FIG. 2. These fields include other attributes that may be found in the digital hauling confirmation ticket, and of which are automatically populated through interactions with the scale (128) itself and other devices and systems in the scale house (110). All such embodiments are well within the scope of the present invention.

As mentioned above and illustrated in FIG. 2, printers (138) useful in printing physical tickets (140) are widely available and often already in use at scale houses. The system of FIG. 2 includes a software plug-in adapted to use with the print driver of the printer (138) to create the digital hauling confirmation ticket (118) and send it through the network (103) to the digital ticket server (144). Print driver's or print processors and print plug-ins are at the software layer of the OSI model and are utilized to communicate with operating system's and hardware layer devices. Print drivers allow applications to function as printers without being aware of the technical details of each printer model attached. Print drivers often operate over a network or networked devices and function as an application for detecting and delivering print functionality. Additionally, the scale house operations application is associated with a printer (138) adapted to print a physical confirmation ticket (140). In the present embodiment the physical confirmation ticket contains information that is also on the digital ticket (118).

Print drivers and printer plugins are available on many computing systems. For example, in UNIX™ systems a modular Common Unix Printing System ("CUPS") system allows a computer to act as a print server. A computer running CUPS is a host that can accept print jobs from client computers, processing the print jobs, and sending them to the appropriate printer or destination. CUPS consists of a print spooler and a scheduler, a filter system that converts the print data to a format that the printer can process, and a backend system that transmits data to the print device. Often times print drivers are implemented as a subroutine or subroutines to a processing stream. The print driver will occupy the front-end printing system, while the printer and the spoolers constitute the back end of the printing functionality. CUPS makes use of the Internet Printing Protocol ("IPP") as the basis for managing print queues. The IPP is a protocol is a communication between computers, print servers, and printers. IPP allows programs to send one or more print jobs to a printer or server and perform additional administrative tasks such as querying the status of the printer, obtaining the status of print jobs, or cancelling or otherwise managing print jobs.

In Microsoft Windows™ based systems, print drivers utilize the GDI or XPS application scripts. Programs can then use the standard API functionality to draw text and pictures both on screen and on paper. GDI printers are often also referred to as Winprinters and are often incompatible with other operating systems.

In the example embodiments of FIG. 2, the material pick-up site is illustrated as a platform or system that can be installed at locations by implementing the disclosed material. Therefore, the illustration of FIG. 2 is an embodiment that can be sold and installed as a package or kit for quick installation at a material pick-up site or material drop-off site.

Figure 3:
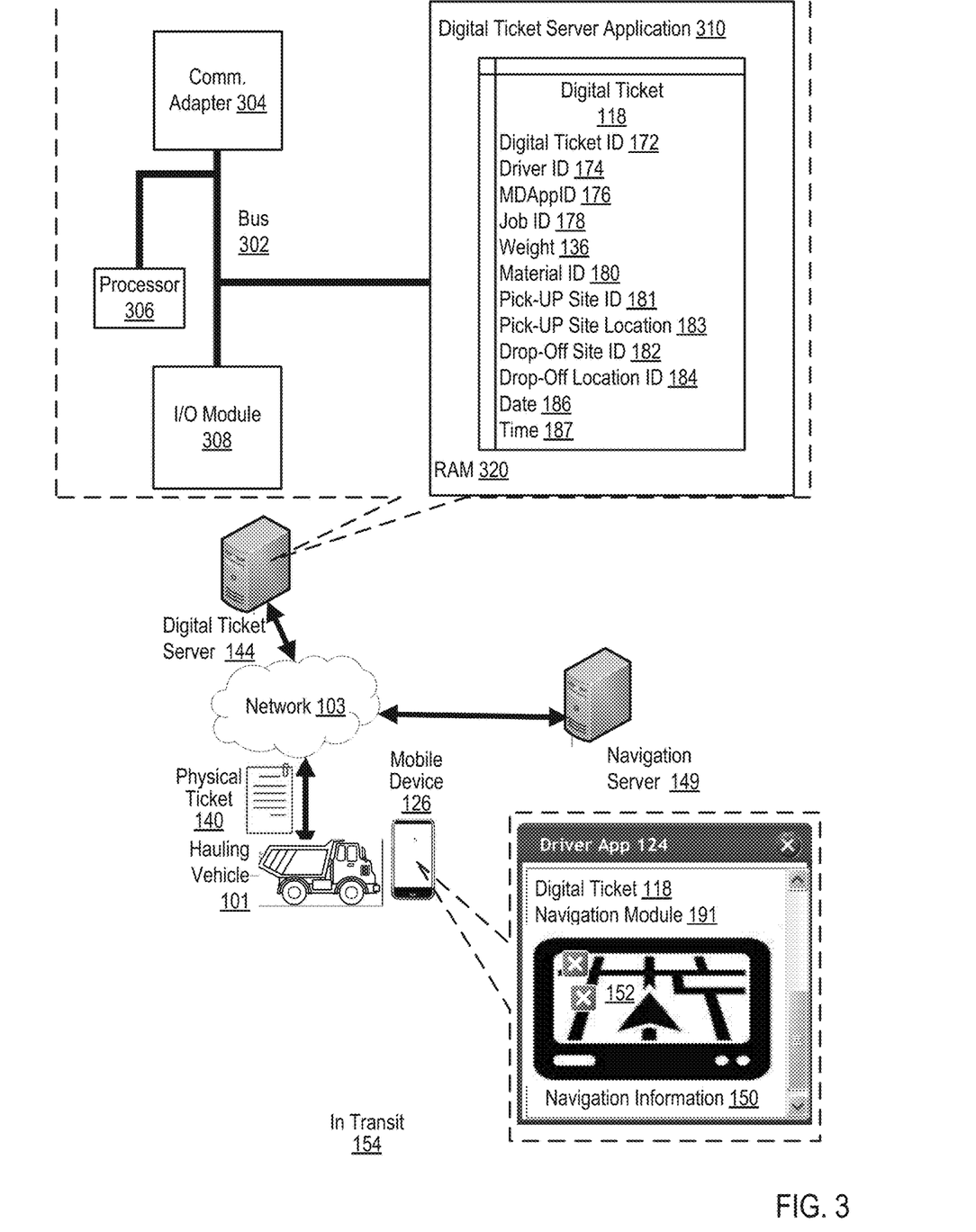
FIG. 3 sets forth a system diagram illustrating a networked system for hauling vehicle administration in transit according to example embodiments of the present invention.

For further explanation, FIG. 3 sets forth a system diagram illustrating a networked system (100) for hauling vehicle (101) administration according to example embodiments of the present invention. FIG. 3 illustrates aspects of hauling vehicle administration according to embodiments of the present invention during the period of time that the hauling vehicle is in transit (154) between and material pick up site and a drop off site.

In the example of FIG. 3, the operator of the hauling vehicle (101) administers a mobile device (126) having installed upon it a mobile driver application (124) that is coupled for data communications with digital ticket server (144) and a navigation server (149) through a network.

The digital ticket server (144) of FIG. 3 is a module of automated computing machinery that includes a digital ticket server application (310) coupled to a communications adapter (304), a processor (306) and an I/O Module (308) through a bus (302). The digital ticket server application (310) of FIG. 1 receives and administers a digital hauling confirmation ticket (118) from a scale house running and administration application augmented in accordance with the present invention with a printer driver plug-in and transmits the digital hauling confirmation ticket (118) to a mobile driver application (124), or in alternative embodiments receives digital hauling attributes through the printer driver plug-in separately and creates a digital hauling confirmation ticket and then transmits that ticket to the mobile driver application or applications administered at the drop-off site.

As mentioned above, digital hauling confirmation tickets (118) according to the embodiments of the present invention, are often implemented as one or more instances of a digital ticket (118) having a defined data structure efficiently representing hauling attributes and their respective values of the hauling of the material from the pick-up site to the drop-off site. In the example of FIG. 3, the digital hauling confirmation ticket (118) is implemented as a digital ticket stored and administered in memory on whatever device the ticket resides and includes a number of example hauling attributes. The example digital hauling confirmation ticket (118) of FIG. 3 includes a Digital Ticket ID (172) uniquely identifying the digital ticket itself. The digital hauling confirmation ticket (118) of FIG. 3 also includes a Driver ID (174) identifying the driver of the hauling vehicle; a MDAppID (176) identifying the mobile driver application (124) installed on a mobile device (126) administered by the driver of the hauling vehicle (101).

The digital hauling confirmation ticket (118) of FIG. 3 also includes a Job ID (178) identifying a particular job associated with the transportation of the material being hauled by the hauling vehicle (101). The digital hauling confirmation ticket (118) of FIG. 3 includes a Weight (136). Such a weight may be the weight of the material being transported, the weight of the hauling vehicle after picking up the material being transported or an y other method of identifying the weight of the material being transported such that the delivery of the material may be confirmed as will occur to those of skill in the art.

The digital hauling confirmation ticket (118) of FIG. 3 also includes a Material ID (180) identifying the material being transported by the hauling vehicle. Examples of materials transported and administered according to embodiments of the present invention include gravel, asphalt, lime, stone, sand, bush, wood, timber, and many others as will occur to those of skill in the art.

The digital hauling confirmation ticket (118) of FIG. 3 includes a Pick-up Site ID (181) identifying the pick site and also a Pick-up Site Location (183) identifying the location of that pick-up site. The digital hauling confirmation ticket (118) of FIG. 3 al includes a Drop-off Site ID (182) identifying the drop-off site and also Drop-off Location ID (184) identifying the location of that drop-off site.

The digital hauling confirmation ticket (118) of FIG. 3 includes a Date (186) and Time (187). Such a date and time may represent the date and time of the pick-up of the material, the drop-off of the material, or any other date and time field that will occur to those of skill in the art. While only one date and time are depicted in the example of FIG. 3, those of skill in the art will appreciate that this is for ease of explanation and not for limitation. Many dates and times representing dates and times of various aspects of the transportation of the material by the hauling vehicle may be included in a digital hauling confirmation ticket and all such dates and times are well within the scope of the present invention.

The example hauling vehicle attributes of the digital hauling confirmation ticket (118) of FIG. 3 are for explanation and not for limitation. Many additional or alternative hauling attributes may be included in a digital hauling confirmation ticket (118) according to embodiments of the present invention as will occur to those of skill in the art and all such hauling attributes are well within the scope of the present invention.

In the example of FIG. 3, the mobile driver application (124) maintains the digital hauling confirmation ticket (118) but also has a navigation module (191). The navigation module (191) is a module of automated computing machinery that aids a driver of the hauling vehicle in the selection of routes between the material pick up site and the drop-off site. Typically, such routs are weight based such that the structural integrity of the roads being traversed by the hauling vehicle are sound and secure.

In the example of FIG. 3, the navigation server (149) and the digital ticket server (144) work provide weight based navigation information such that the navigation module (191) can provide that navigation information (150) in the form of a user-friendly route based navigation showing a route that is structurally sound and secure. That is, the route provided by the navigation module (191) is based first on safety of the hauling vehicle, the material transported by the hauling vehicle, and the driver of the hauling vehicle.

In the example of FIG. 3, the weight-based navigation module (191) of the mobile driver application adapted for data communications with a navigation server and configured to retrieve navigation information (150) from the navigation server and retrieve one or more routes identified by the navigation server (149). Navigation servers may be implemented as third-party service providers already with route and navigation information available through an application programming interface ('API') such as Google® Maps, WAZE, and others as will occur to those of skill in the art.

The weight-based navigation module (191) of FIG. 3 confirms that all roads on the identified route conform to structural requirements for the current weight of the hauling vehicle identified in the digital ticket. In some embodiments, the weight-based navigation module (191) of FIG. 3 confirms that all roads on the identified route conform to structural requirements for the current weight of the hauling vehicle identified in the digital ticket by retrieving the route information from the navigation server and then retrieving from the digital ticket server publically available information regarding the structural integrity and soundness of roads, highways, streets and the other travel ways available to the hauling vehicle and tis driver.

The navigation module (191) of FIG. 3 may also confirm that all roads on the identified route conform to structural requirements for the current weight of the hauling vehicle identified in the digital ticket by retrieving predefined structural information for each road on the identified route and comparing, for each road on the identified route, the retrieved structural information for each road with the current weight of the hauling vehicle. The weight-based navigation module (191) of FIG. 3 provides to the user, through the graphical user interface of the mobile driver application (124), an indication (152) of each road on the identified route that does not conform to the structural requirements for the current weight of the hauling vehicle. In the example of FIG. 3, the indication (152) of each road on the identified route that does not conform to the structural requirements for the current weight of the hauling vehicle is depicted as an "X" (152) indicating that a road that might otherwise be on the route of the hauling vehicle is not structurally sound and the driver may choose to avoid that portion of the route and use and other travel way. The navigation module works as an API layer with access to the navigation server (149) in order to provide updatable and rapidly deployed information.

In the system of FIG. 3, the driver of the hauling vehicle also maintains a physical ticket (140) that contains the hauling attributes. Such a physical ticket usefully provides a paper trail back-up to the digital hauling confirmation ticket (118) such that administration of the hauling vehicle is not disrupted and maximizes any available efficiencies. Additional embodiments do not include a paper ticket system and rely on a digital ticket (118) along with networked storage as a backup for hauling vehicle administration.

Figure 4:
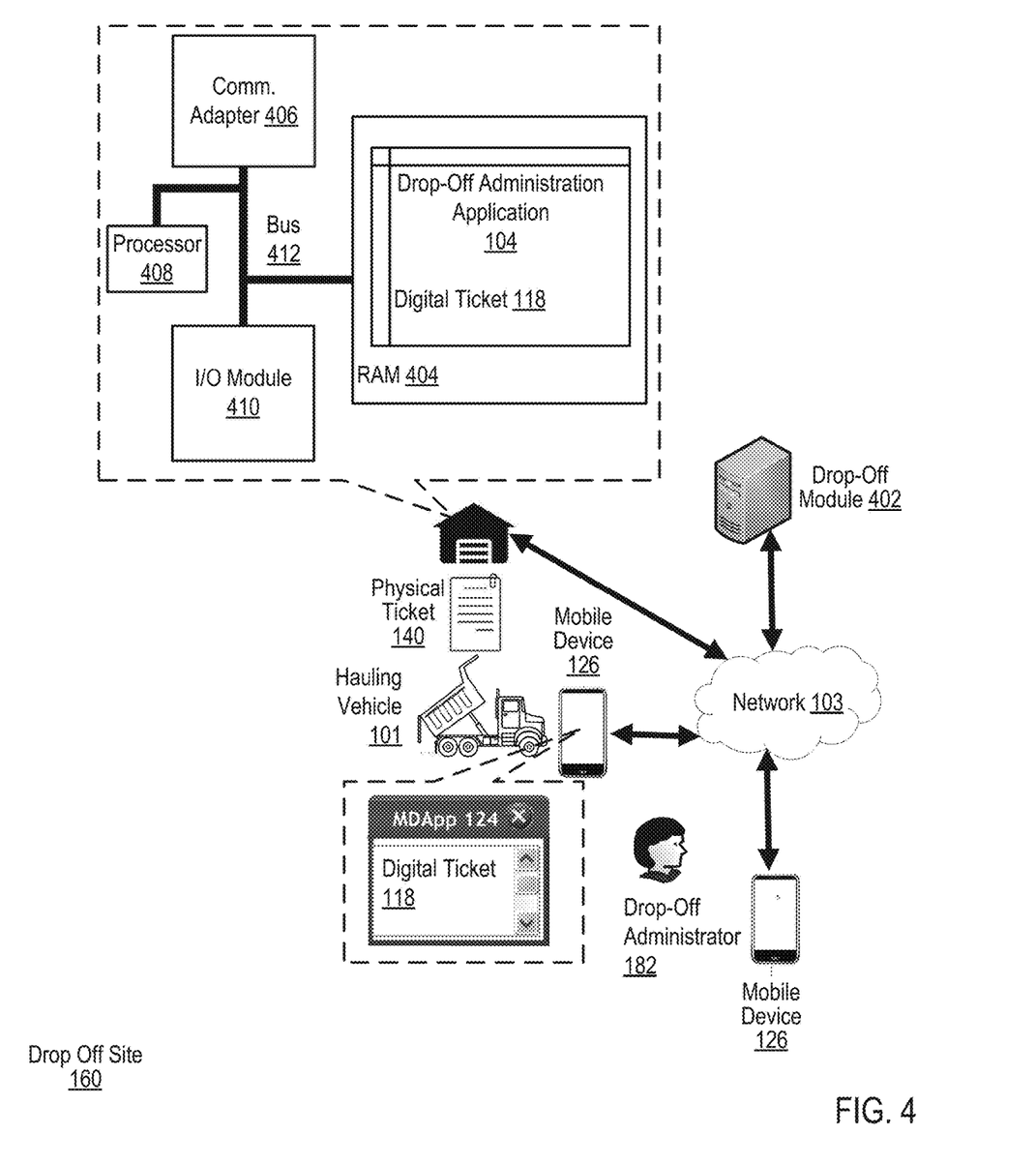
FIG. 4 sets forth a system diagram illustrating a networked system for hauling vehicle administration at a drop-off according to example embodiments of the present invention.

For further explanation, FIG. 4 sets forth a system diagram illustrating a networked system for hauling vehicle (101) administration at a drop-off site (160) according to example embodiments of the present invention. FIG. 4 illustrates aspects of hauling vehicle administration according to embodiments of the present invention while the hauling vehicle is at drop-off site.

In the example of FIG. 4, the operator of the hauling vehicle (101) administers a mobile device (126) having installed upon it a mobile driver application (124) with the digital hauling confirmation ticket (118). The mobile driver application (124) of FIG. 4 is coupled for data communications with a drop-off administration module (402) through a network (103). The drop-off administration module (402) is a module of automated computing machinery that includes a drop-off administration application (104) depicted as executing in RAM (404) and coupled to a communications adapter (406), a processor (408) and an I/O Module (410) through a bus (412).

The drop-off administration module (402) of FIG. 4 usefully confirms that the material being transported by the hauling vehicle was successfully delivered to the drop-off site. In some embodiments, the drop-off administration module (402) communicates through the network with the navigation module or other functionality of the mobile driver application (124) confirming that the hauling vehicle (101) arrived at the drop-off site. In such embodiments, successful drop-off of the material is inferred from the fact that the hauling vehicle arrived at the drop-off site In another embodiment of the system of FIG. 4, the drop-off administration module (402) communicates through the network with the mobile driver application (124) and identifies that the bed of the hauling vehicle is in a drop-off position. In such embodiments, successful drop-off of the material is inferred from the fact that the hauling vehicle has lifted its bed and is in a drop-off position.

In another embodiment of the system of FIG. 4, the drop-off administration module (402) provides an interactive drop-off kiosk and the digital ticket administered by the digital mobile driver application is provided to the drop-off kiosk. Such a drop-off kiosk may be implemented as a computing device with data communications to receive a digital hauling confirmation ticket (118) from the mobile driver application (124) to confirm the drop off of the material. The drop-off kiosk is additionally equipped to communicate to the digital ticket server (144) through the network (103) to transmit receipt to the scale house administration application (104) as well as store attributes of the drop off.

In still another embodiment of the system of FIG. 4, the drop off site (160) has an administrator (182) that maintains a drop off administration application on a mobile device. In some embodiments, that application receives through the network (103) the digital hauling confirmation ticket (118) confirming that the material was successfully delivered to the drop-off site.

In still another embodiment of the system of FIG. 4, the digital ticket server identifies through GPS or other location information of the mobile driver application that the hauling vehicle arrived at the drop off site (160). The identification that the hauling vehicle arrived at the drop-off site is used as confirmation that the material was successfully delivered to the drop-off site.

Figure 5:
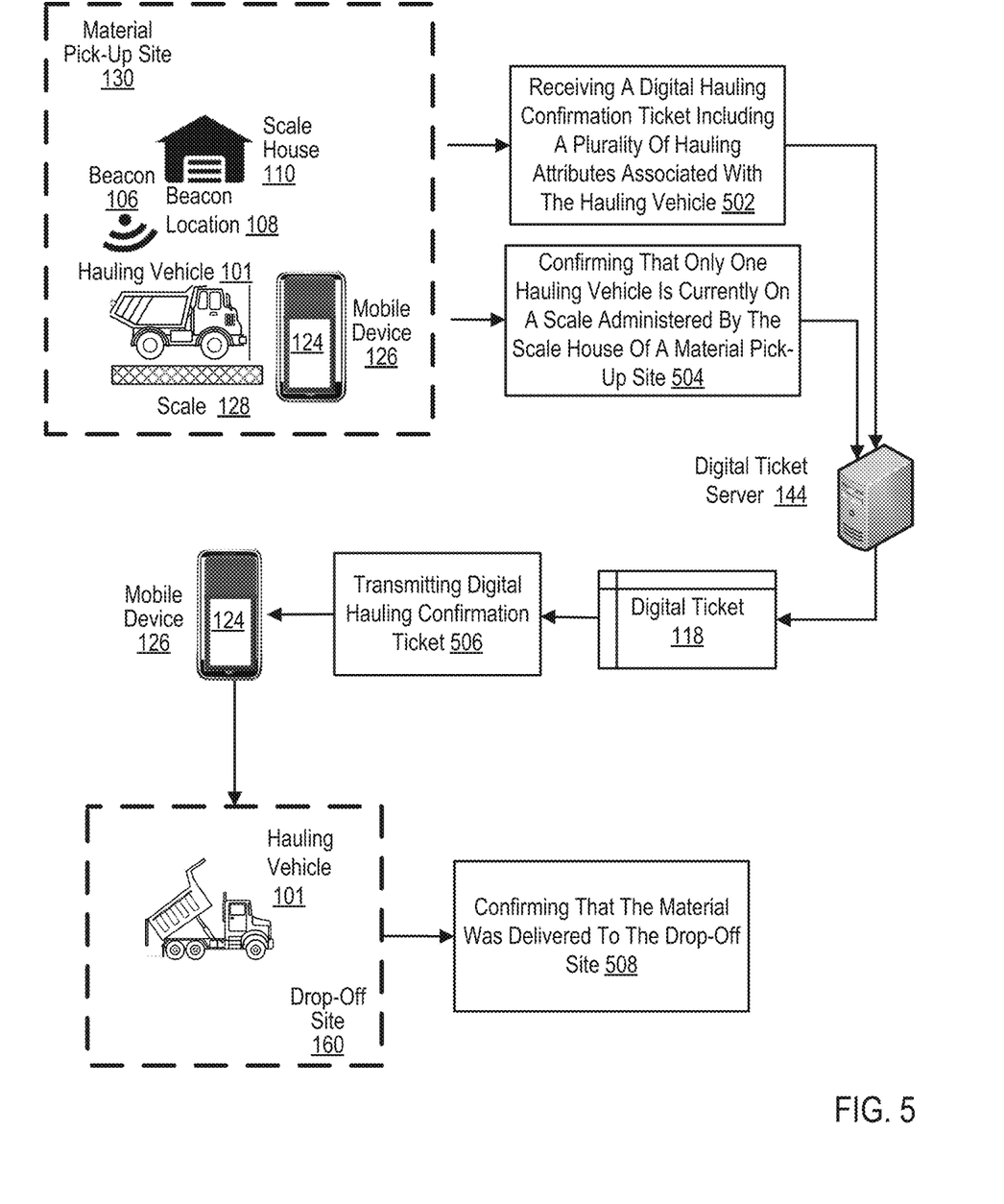
FIG. 5 sets forth a flowchart illustrating a method for hauling vehicle administration according to embodiments of the present invention.

For further explanation, FIG. 5 sets forth a flowchart illustrating a method for hauling vehicle (101) administration according to embodiments of the present invention. The method of FIG. 5 includes receiving (502), by a digital ticket server (144) from a scale house operations application (112) in dependence upon hauling parameters digital hauling confirmation ticket (118) including a plurality of hauling attributes associated with the hauling vehicle (101). In the example of FIG. 5, the digital hauling confirmation ticket (118) includes a plurality of hauling attributes associated with the hauling vehicle (101) which are identified automatically by the scale itself and supplemented in necessary by a scale house operator. The digital hauling confirmation ticket (118) is then generated and transmitted to the digital ticket server through a printer plug-in associated with a printer adapted to print a physical confirmation ticket including the same or similar attributes.

The method of FIG. 5 also includes confirming (504), by a digital ticket server (144), that only one hauling vehicle (101) is currently on the scale (128) associated with the scale house (110). In the example of FIG. 5, the digital ticket server (144) receives from the mobile device application (124) a number of beacon IDs and beacon values associated with the beacons (106) at particular locations (108) associated with the scale (128) of the scale house. The digital ticket server (144) confirms based upon the beacon IDs, the beacon values, the scale house, the distance from the beacons to the scale, and other attributes presented in the digital hauling confirmation ticket that only the hauling vehicle associated with the digital ticket is or was on the scale at the time the digital hauling vehicle confirmation ticket is or was generated.

As mentioned above, confirming (504), by a digital ticket server (144), that only one hauling vehicle (101) is currently on the scale (128) associated with the scale house (110). may be carried out by triangulating the position of the hauling vehicle (101) in dependence upon the location of the one or more beacons (106). Such triangulation may triangulate the position of the of the mobile driver application (124) operated by the driver within the hauling vehicle (101) through the use of the beacons and infer the location of the hauling vehicle (101) from the triangulated position of the mobile driver application (124) installed on, for example, a mobile device operated by the driver of the hauling vehicle. In alternative embodiments, such an application may be installed directly into the hauling vehicle to administer the triangulation as will occur to those of skill in the art.

The method of FIG. 5 also includes transmitting (506), by the digital ticket server (144) to the mobile driver application (124), the digital hauling confirmation ticket (214). Transmitting (506), by the digital ticket server (144) to the mobile driver application (124), the digital hauling confirmation ticket (214) may be carried out through networks coupling the digital ticket server and the mobile driver application for data communications any a number of ways as discussed above and as will occur to those of skill in the art.

The method of FIG. 5 also includes confirming (508), by the digital ticket server (144), that the material was delivered to the drop-off site (160). Confirming (508), by the digital ticket server (144), that the material was delivered to the drop-off site (160) according to embodiments of the present invention be carried out by confirming, in dependence upon a navigation module associated with the mobile driver application (126), that that the material delivered by the hauling vehicle (101) arrived at the drop-off site.

Confirming (508), by the digital ticket server (144), that the material was delivered to the drop-off site (160) according to the method of FIG. 5 may also be carried out by confirming, by a drop off administrator module in dependence upon the digital ticket (118) that the material delivered by the hauling vehicle (101) arrived at the drop-off site.

Confirming (508), by the digital ticket server (144), that the material was delivered to the drop-off site (160) according to the method of FIG. 5 may also be carried out by also identifying that the bed of the hauling vehicle is in a drop-off position.

Confirming (218), by the digital ticket server (144), that the material was delivered to the drop-off site (160) according to the method of FIG. 5 may also be carried out confirming, in dependence upon a drop-off kiosk and the digital ticket administered by the digital mobile driver application one, that that the material delivered by the hauling vehicle (101) arrived at the drop-off site.

Figure 6:
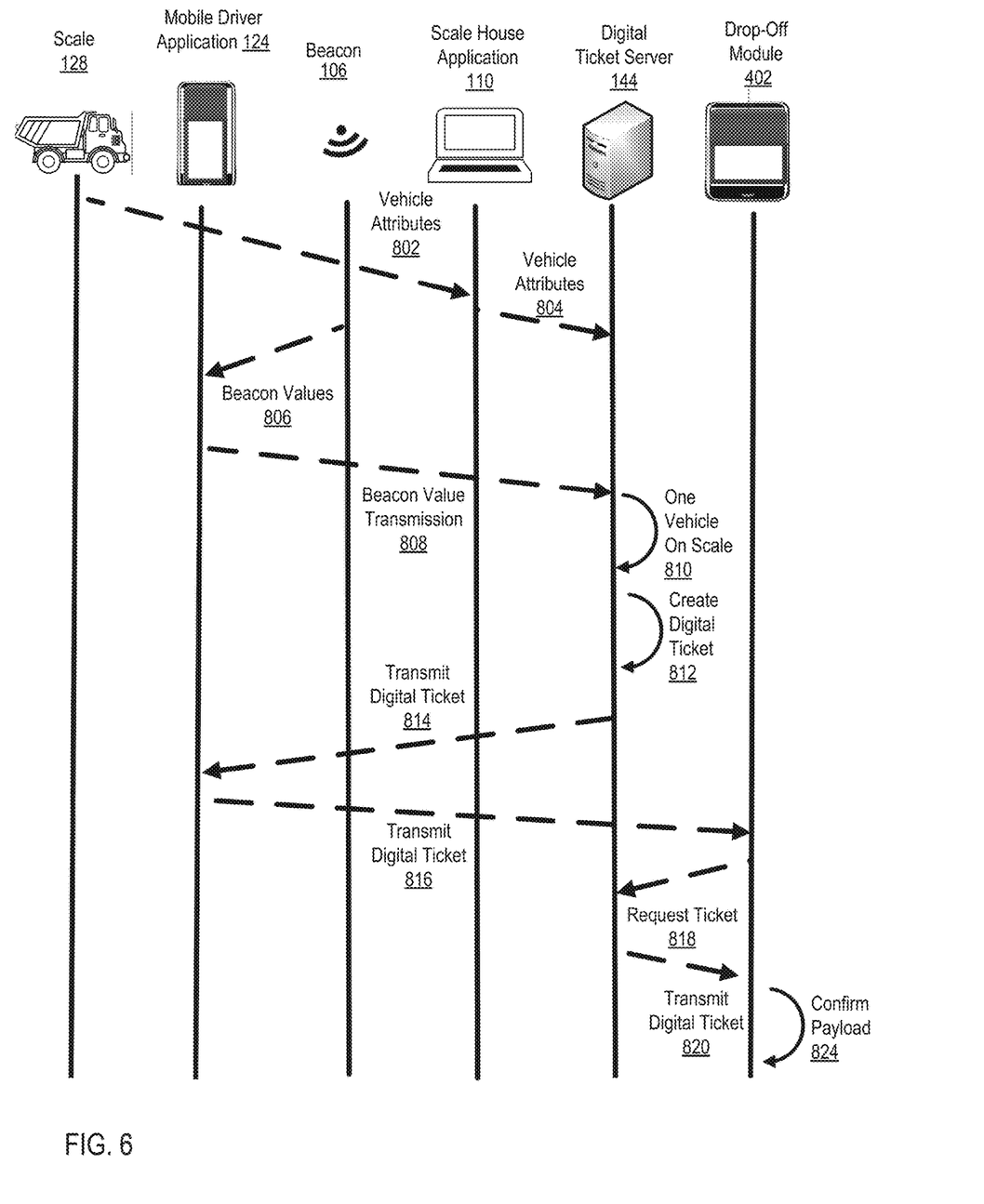
FIG. 6 sets forth a calling sequence diagram illustrating an example of hauling vehicle administration according to embodiments of the present invention.

For further explanation, FIG. 6 sets forth a calling sequence diagram illustrating an example of hauling vehicle administration according to embodiments of the present invention. In the example of FIG. 6, the hauling vehicle arrives on a scale (128) at the scale house. In typical embodiments, the scale (128) itself provides to the scale house application (110) a number of hauling vehicle attributes (802) including at least the current weight of the vehicle and other attributes as will occur to those of skill in the art.

In the example of FIG. 6, the scale house application (110) sends (650) those attributes to a digital ticket server (144) through a printer plug-in for creation of a digital ticket.

In the example of FIG. 6, the mobile driver application (124) receives one or more beacon values (806) and one or more beacon IDs from the beacons (106) associated with the scale house. The mobile driver application (124) of FIG. 6 then transmits (808) those values to the digital ticket server (144).

In the example of FIG. 6, the digital ticket server (144) confirms (810) that only one vehicle is on the scale and that the vehicle on the scale is also associated with the hauling vehicle attributers transmitted to the digital ticket server. The digital ticket server (144) creates (812) a digital hauling confirmation ticket and then transmits (814) that digital hauling confirmation ticket to the mobile driver application (124).

Upon arrival at the drop-off location, the mobile driver application (124) of FIG. 6 transmits (816) the digital hauling confirmation ticket to the drop-off administration module (402) confirming that the material was successfully delivered to the drop-off site. In the example of FIG. 6, the drop off module (402) may also request (818) the digital ticket from the digital ticket server (144) and receive in response a digital ticket transmission (820) of the digital ticket. The drop-off administration module (402) then confirms (824) that the material was successfully transported to the drop-off site.

Figure 7:
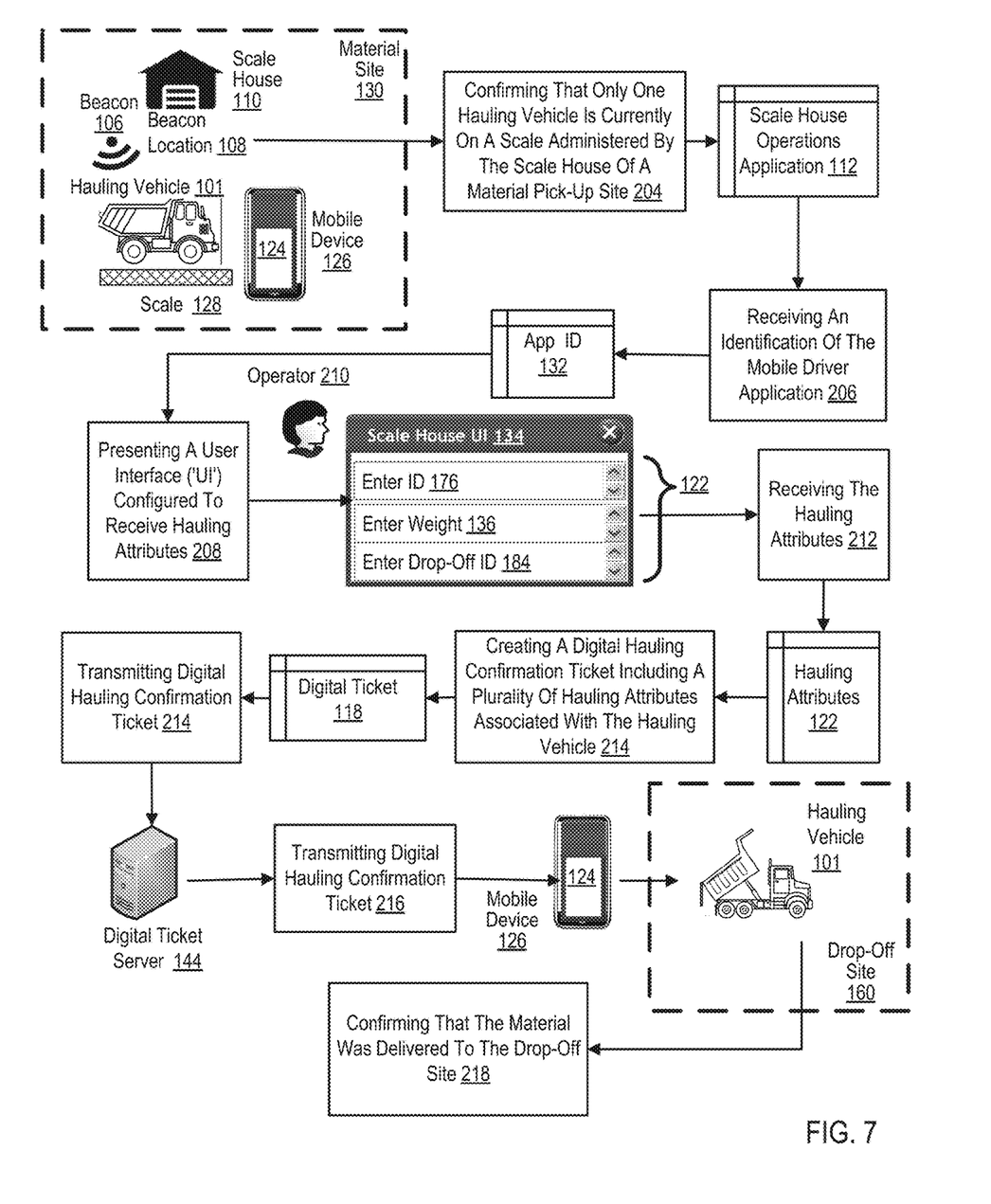
FIG. 7 sets forth a flowchart illustrating a method for hauling vehicle administration according to embodiments of the present invention.

For further explanation, FIG. 7 sets forth a flowchart illustrating a method for hauling vehicle (101) administration according to embodiments of the present invention. The method of FIG. 5 includes confirming (204), by a scale house operations application (112) in dependence upon data communications received through one or more beacons (106) located at one or more particular locations (108) relative to a scale (128) administered by a scale house (110) of a material pick-up site, that only one hauling vehicle (101) is currently on the scale (128). As mentioned above, confirming (204), by a scale house operations application (112) in dependence upon data communications received through one or more beacons (106) located at one or more particular locations (108) relative to a scale (128), that only one hauling vehicle is currently on a scale administered by the scale house of a material pick-up site may be carried out by triangulating the position of the hauling vehicle (101) in dependence upon the location of the one or more beacons (106). Such triangulation may triangulate the position of the of the mobile driver application (124) operated by the driver within the hauling vehicle (101) through the use of the beacons and infer the location of the hauling vehicle (101) from the triangulated position of the mobile driver application (124) installed on, for example, a mobile device operated by the driver of the hauling vehicle. In alternative embodiments, such an application may be installed directly into the hauling vehicle to administer the triangulation as will occur to those of skill in the art.

The method of FIG. 7 also includes receiving (206), by the scale house operations application (112) from a mobile driver application (124) associated with the hauling vehicle (101), an identification of the mobile driver application (132). As discussed above, mobile driver applications (124) are often installed on mobile devices (128) and administered by the driver of the hauling vehicle (101). In typical embodiments, the scale house operations application sends a request to the mobile driver application for its identification and receives a response containing the identification.

The method of FIG. 7 also includes presenting (208), by the scale house operations application (112) to a scale house operator (210), a UI (134) configured to receive hauling attributes (176, 136, 122). Presenting (208), by the scale house operations application (112) to a scale house operator (210), a UI (134) configured to receive hauling attributes (176, 136, 122) includes displaying through an application window on a monitor the relevant hauling vehicle attributes, as well as allowing entry of the relevant hauling vehicle attributes. Additional embodiments provide automated entry of attributes such as hauling vehicle weight at the material pick-up site by the automated computing machinery working in coordination with the hauling vehicle administration application.

The method of FIG. 7 also includes receiving (212), through the UI (134) from the scale house operator (210), the hauling attributes (176, 136, 122). As mentioned above, receiving (212), through the UI (134) from the scale house operator (210), the hauling attributes (122) may be carried out by receiving from an operator of the scale house (110) hauling attributes (122) of the transportation of the material being loaded at the pick-up site (130) including one or more of a weight, digital ticket ID, driver ID, mobile driver application ID, job ID, current weight of the vehicle; material ID, drop-off site ID, drop-off site location, pick-up site ID, pick-up site location, date, time and other attributes as will occur to those of skill in the art.

The method of FIG. 7 also includes creating (214), by the scale house operations application (112) in dependence upon the hauling parameters (176, 136, 122), a digital hauling confirmation ticket (118) including a plurality of hauling attributes (176, 136, 122) associated with the hauling vehicle (101). Creating (214), by the scale house operations application (112) in dependence upon the hauling attributes (122), a digital hauling confirmation ticket (118) including a plurality of hauling attributes (122) associated with the hauling vehicle (101) according to the method of FIG. 6 may be carried out by creating the digital hauling confirmation ticket (118) through a printer plug-in (142) associated with a printer (138) adapted to print a physical confirmation ticket (140) and wherein the digital hauling confirmation ticket (118) includes one or more attributes (122) of a physical confirmation ticket printed by the printer (138) associated with the printer plug-in (142).

In some embodiments of the present invention, methods for hauling vehicle (101) administration also include providing attributes (122) to a printer (138) for physical printing of a physical hauling confirmation ticket (140) and wherein the physical confirmation ticket (140) includes one or more of the same hauling attributes (122) as the digital hauling confirmation ticket (118). Such a physical hauling confirmation ticket provides a physical back-up to the electronic administration of the digital hauling confirmation tickets according to embodiments of the present invention.

The method of FIG. 7 also includes transmitting (214), by the scale house operations application (112) to a digital ticket server (144), the digital hauling confirmation ticket (118).

The method of FIG. 7 also includes transmitting (216), by the scale house operations application (112) to the mobile driver application (124), the digital hauling confirmation ticket (214).

In some embodiments of the present invention, methods for hauling vehicle (101) administration also include retrieving one or more routes identified by a weight based navigation server (149); confirming, in dependence upon the weight of the hauling vehicle, that all roads on the identified route conform to structural requirements for the current weight of the hauling vehicle. In some embodiments, confirming that all roads on the identified route conform to structural requirements for the current weight of the hauling vehicle may be carried out by retrieving predefined structural information for each road on the identified route; comparing, for each road on the identified route, the retrieved structural information for each road with the current weight of the hauling vehicle; and providing to the user, through the graphical user interface of the mobile driver application (124), an indication (152) of each road on the identified route that does not conform to the structural requirements for the current weigh of the hauling vehicle.

The method of FIG. 7 also includes confirming (218), by the digital ticket server (144), that the material was delivered to the drop-off site (160). Confirming (218), by the digital ticket server (144), that the material was delivered to the drop-off site (160) according to embodiments of the present invention may also be carried out by confirming, in dependence upon the navigation module, that that the material delivered by the hauling vehicle (101) arrived at the drop-off site.

Confirming (218), by the digital ticket server (144), that the material was delivered to the drop-off site (160) according to the method of FIG. 7 may also be carried out by confirming, by a drop off administrator module in dependence upon the digital ticket (118) that the material delivered by the hauling vehicle (101) arrived at the drop-off site.

Confirming (218), by the digital ticket server (144), that the material was delivered to the drop-off site (160) according to the method of FIG. 7 may also be carried out by also identifying that the bed of the hauling vehicle is in a drop-off position.

Confirming (218), by the digital ticket server (144), that the material was delivered to the drop-off site (160) according to the method of FIG. 7 may also be carried out confirming, in dependence upon a drop-off kiosk and the digital ticket administered by the digital mobile driver application one, that that the material delivered by the hauling vehicle (101) arrived at the drop-off site.

Figure 8:
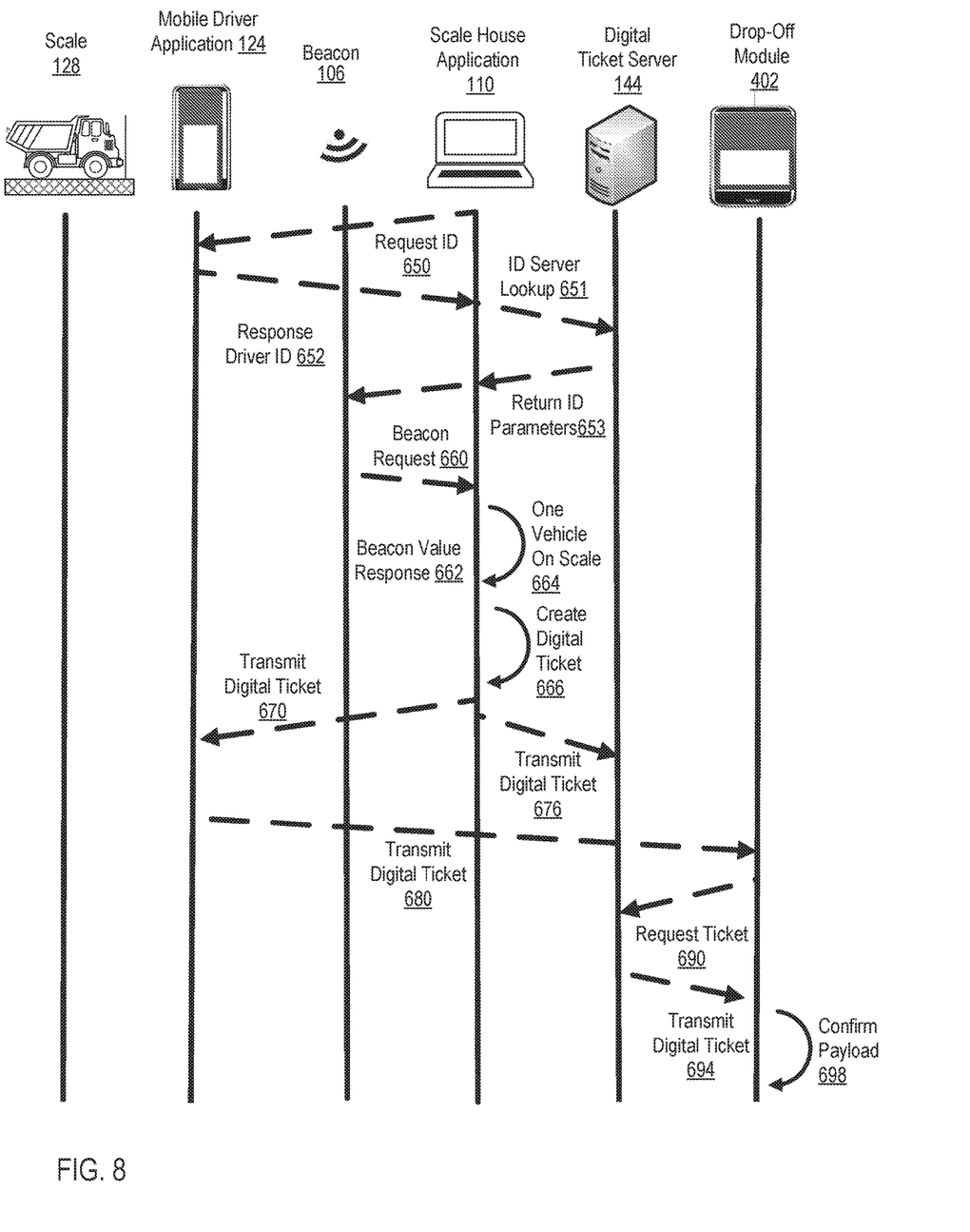
FIG. 8 sets forth a calling sequence diagram illustrating an example of hauling vehicle administration according to embodiments of the present invention.

For further explanation, FIG. 8 sets forth a calling sequence diagram illustrating an example of hauling vehicle administration according to embodiments of the present invention. In the example of FIG. 8, the vehicle arrives on scale (128) at a scale house.

In the example of FIG. 8, the scale house application (110) sends a request (650) for an identification of the mobile driver application to the mobile driver application (124) and receives a response (652) containing the ID of the mobile driver application. The scale house application (110) of FIG. 6 then sends request (660) for a value of one or more beacons located to confirm that only one hauling vehicle is on the scale. The one or more beacons (106) of FIG. 6 send a response (662) with beacon values to the scale house application (110).

The scale house application (110) of FIG. 8 confirms (664) that only one vehicle is on the scale.

The scale house application (110) of FIG. 8 also creates (666) a digital hauling confirmation ticket and transmits (670) that digital hauling confirmation ticket to the mobile driver application (124). The scale house application (110) of FIG. 6 also transmits (676) the digital hauling confirmation ticket to a digital ticket server (144).

Upon arrival at the drop-off location, the mobile driver application (124) of FIG. 8 transmits the digital confirmation ticket to the drop-off administration module (402) confirming that the material was successfully delivered to the drop-off site. In the example of FIG. 8, the drop off module (402) may also request (690) the digital ticket from the digital ticket server and receive in response a digital ticket a transmission (694) of the digital ticket. The drop-off administration module (402) then confirms that the material was successfully transported to the drop-off site.

Modifications, additions, or omissions may be made to the various embodiments described herein without departing from the scope of the disclosure. For example, the components of the systems and apparatuses may be integrated or separated. Moreover, the operations of the various embodiments disclosed herein may be performed by more, fewer, or other components and the methods described may include more, fewer, or other steps. Additionally, steps may be performed in any suitable order.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for hauling vehicle administration, the system comprising:
a digital ticket server and a pick-up administration module including one or more beacons and a scale house operations application administering operations for a scale house at the material site, wherein the scale house operations application is also adapted for data communications with the digital ticket server and the digital ticket server is adapted for data communications with a mobile driver application; and
wherein the scale house operations application is configured to create a digital hauling confirmation ticket including a plurality of the hauling attributes and transmit the digital hauling confirmation ticket to the digital ticket server and the digital ticket server is configured to transmit the digital hauling confirmation ticket to the driver mobile application and wherein
the mobile driver application further comprises a weight-based navigation module adapted for data communications with a navigation server and configured to retrieve, in dependence upon the digital hauling confirmation ticket, navigation information from the navigation server;
retrieve, in dependence upon the digital hauling confirmation ticket, one or more routes identified by the navigation server; and
confirming that all roads on the identified route conform to structural requirements for the current weight of the hauling vehicle identified in the digital ticket.

2. The system for hauling vehicle administration of claim 1 wherein the navigation module configured to confirm that all roads on the identified route conform to structural requirements for the current weight of the hauling vehicle identified in the digital ticket is further configured to:
retrieve predefined structural information for each road on the identified route; and
compare, for each road on the identified route, the retrieved structural information for each road with the current weight of the hauling vehicle; and
provide to the user, through the graphical user interface of the mobile driver application, an indication of each road on the identified route that does not conform to the structural requirements for the current weigh of the hauling vehicle.

3. The system for hauling vehicle administration of claim 1 wherein the one or more beacons are also adapted for data communications with the mobile driver application and the mobile driver application is adapted to transmit one or more beacon identifications and beacon values to the digital ticket server.

4. The system for hauling vehicle administration of claim 1 wherein the digital ticket server is configured to determine whether a single hauling vehicle is on a scale in dependence upon the beacon identifications and the beacon values.

5. The system for hauling vehicle administration of claim 3 wherein the digital ticket server is further configured to determine whether a single hauling vehicle is on a scale also in dependence upon a known distance between the scale and the one or more beacons.

6. The system for hauling vehicle administration of claim 1 wherein the scale house operations application also includes a graphical user interface ('GUI') for receiving from an operator of the scale house one or more hauling attributes of the transportation of the material being loaded at the pick-up site including at least an identification of the hauling vehicle.

7. The system for hauling vehicle administration of claim 1 wherein the scale house operations application is configured to create a digital hauling confirmation ticket through a printer plug-in associated with a printer adapted to print a physical confirmation ticket and
the digital hauling confirmation ticket includes one or more attributes of a physical confirmation ticket printed by the printer associated with the printer plug-in.

8. The system for hauling vehicle administration of claim 1 also provides the hauling attributes to the printer for physical printing of a physical hauling confirmation ticket and wherein the physical confirmation ticket includes one or more of the same hauling attributes as the digital hauling confirmation ticket.

9. The system for hauling vehicle administration of claim 1 wherein the attributes of the transportation of the material being loaded at the pick-up site include one or more of a digital ticket ID, driver ID, mobile driver application ID, job ID, current weight of the vehicle; material ID, drop-off site ID, drop-off site location, pick-up site ID, pick-up site location, date, and time.

10. A method for hauling vehicle administration, the system comprising:
a digital ticket server and a pick-up administration module and a scale house operations application administering operations for a scale house at the material site, wherein the scale house operations application is also adapted for data communications with the digital ticket server and the digital ticket server is adapted for data communications with a mobile driver application; and
wherein the scale house operations application is configured to create a digital hauling confirmation ticket including a plurality of the hauling attributes and transmit the digital hauling confirmation ticket to the digital ticket server and the digital ticket server is configured to transmit the digital hauling confirmation ticket to the driver mobile application, and wherein
the mobile driver application further comprises a weight-based navigation module adapted for data communications with a navigation server and configured to retrieve, in dependence upon the digital hauling confirmation ticket, navigation information from the navigation server;
retrieve, in dependence upon the digital hauling confirmation ticket, one or more routes identified by the navigation server; and
confirming that all roads on the identified route conform to structural requirements for the current weight of the hauling vehicle identified in the digital ticket.

11. The system for hauling vehicle administration of claim 10 wherein the navigation module configured to confirm that all roads on the identified route conform to structural requirements for the current weight of the hauling vehicle identified in the digital ticket is further configured to:
  retrieve predefined structural information for each road on the identified route; and
  compare, for each road on the identified route, the retrieved structural information for each road with the current weight of the hauling vehicle; and
  provide to the user, through the graphical user interface of the mobile driver application, an indication of each road on the identified route that does not conform to the structural requirements for the current weigh of the hauling vehicle.

12. The system for hauling vehicle administration of claim 10 wherein the one or more beacons are also adapted for data communications with the mobile driver application and the mobile driver application is adapted to transmit one or more beacon identifications and beacon values to the digital ticket server.

13. The system for hauling vehicle administration of claim 10 wherein the digital ticket server is configured to determine whether a single hauling vehicle is on a scale in dependence upon the beacon identifications and the beacon values.

14. The system for hauling vehicle administration of claim 13 wherein the digital ticket server is further configured to determine whether a single hauling vehicle is on a scale also in dependence upon a known distance between the scale and the one or more beacons.

15. The system for hauling vehicle administration of claim 10 wherein the scale house operations application also includes a graphical user interface ('GUI') for receiving from an operator of the scale house one or more hauling attributes of the transportation of the material being loaded at the pick-up site including at least an identification of the hauling vehicle.

16. The system for hauling vehicle administration of claim 10 wherein the scale house operations application is configured to create a digital hauling confirmation ticket through a printer plug-in associated with a printer adapted to print a physical confirmation ticket and
  the digital hauling confirmation ticket includes one or more attributes of a physical confirmation ticket printed by the printer associated with the printer plug-in.

17. The system for hauling vehicle administration of claim 10 also provides the hauling attributes to the printer for physical printing of a physical hauling confirmation ticket and wherein the physical confirmation ticket includes one or more of the same hauling attributes as the digital hauling confirmation ticket.

18. The system for hauling vehicle administration of claim 10 wherein the attributes of the transportation of the material being loaded at the pick-up site include one or more of a digital ticket ID, driver ID, mobile driver application ID, job ID, current weight of the vehicle; material ID, drop-off site ID, drop-off site location, pick-up site ID, pick-up site location, date, and time.

* * * * *